Figure 1:
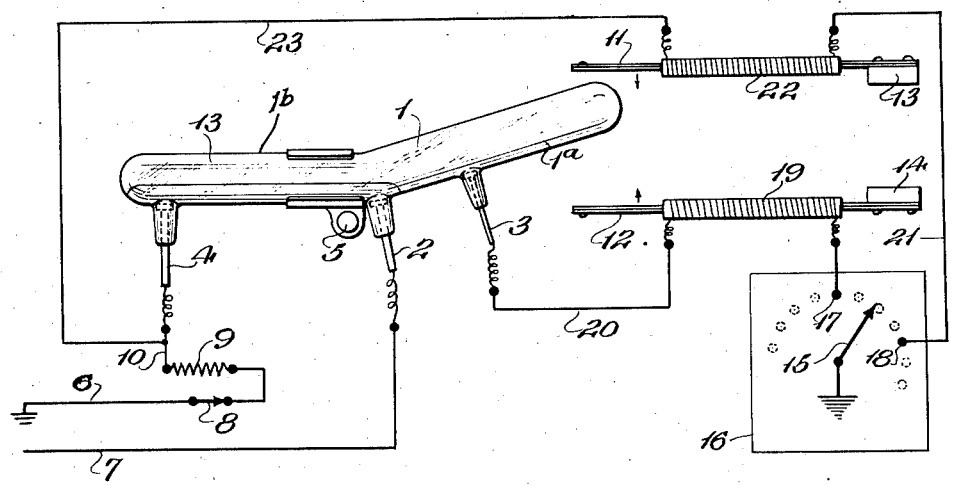

Oct. 11, 1932.  W. NOBLE  1,881,882

ELECTRIC CONTROL

Filed June 10, 1929

Inventor
Warren Noble.

By Stanley Lightfoot
Attorney

Patented Oct. 11, 1932

1,881,882

UNITED STATES PATENT OFFICE

WARREN NOBLE, OF DETROIT, MICHIGAN, ASSIGNOR TO ELECTROMASTER, INC., OF DETROIT, MICHIGAN, A CORPORATION OF MICHIGAN

ELECTRIC CONTROL

Application filed June 10, 1929. Serial No. 369,836.

This invention relates to an arrangement for controlling the flow of current through an electric circuit which may be either manually or automatically operated and which if automatically operated must function in an orderly sequence which comprises a complete cycle unless manually altered prior to a completion thereof.

Another object is to provide an automatic means for carrying out this cycle which will function to establish the circuit according to a predetermined timed setting and to break the circuit according to a further and independent timed setting so that in case the present invention is employed in connection with the burner of an electric stove, for example, a suitable timing means such as a clock may be employed to turn the burner on at a predetermined time and likewise to discontinue the operation of the burner at any desired time interval thereafter.

It is a more specific object to provide a switch which may be actuated through the agency of my automatic means to establish a current flow through the desired circuit and to provide a shunt for this circuit, the shunt to include a suitable means such as a thermostat having delegated to it the function of breaking the said circuit when energized by the grounding of the shunt and to employ my previously described automatic timing means for the purpose of grounding the shunt circuit at any predetermined time.

It is a still further object to provide a device of the class described wherein the main circuit to be established is closed by the agency of a thermostat energized by current flow through a resistance associated therewith, the current flow being established by the previously described automatic means. Thus a current flow is initially set up by my automatic means which flow energizes a thermostat operable to close a circuit through the main line which in the instance given is through the burner, establishment of the circuit through the burner first requiring that the current flow through the preliminary circuit be discontinued.

It is a still further object to provide a tiltable mercury switch having three terminals, the switch comprising a bent tube containing sufficient mercury to connect two of the three terminals, and to employ the aforedescribed thermostats for the purpose of tilting this tube to its various operative positions.

Still further objects or advantages subsidiary or incidental to the aforesaid objects, or resulting from the construction or operation of the invention as it may be carried into effect, will become apparent as the said invention is hereinafter further disclosed.

Figure 2:
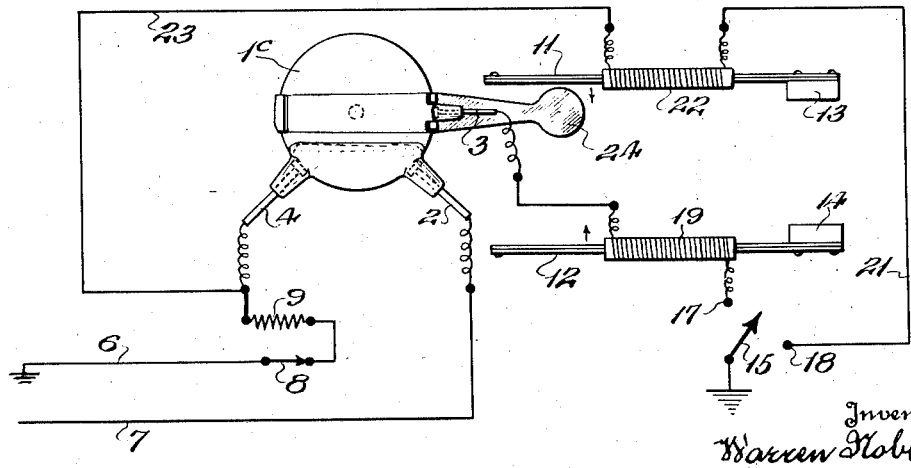

In carrying the said invention into effect, I may adopt the novel arrangement of parts hereinafter described, by way of example, having reference to the accompanying drawing, wherein:

Figure 1 is a schematic diagram of a circuit controlling mechanism embodying the said invention; and Figure 2 is a similar diagram of a somewhat modified form of the device.

Similar characters of reference indicate similar parts in both figures of the drawing.

1 indicates a two-way mercury switch in the form of a bent tube having angularly related arms $1^a$ and $1^b$. A terminal 2 is inserted at the bend of the tube and terminals 3 and 4 inserted in the arms $1^a$ and $1^b$ thereof, the said tube being pivotally mounted at 5 so that it may be tilted in order that its mercury may connect the terminals 2 and 4 or the terminals 2 and 3 according to the direction in which the tube is tilted, as will be readily understood.

6 and 7 are electric leads, the first of which is connected through the main switch 8 to one end of a burner 9, or other device which the mercury switch 1 is to control, the other end of the burner being connected through the line 10 to the terminal 4 of the switch 1, and the lead 7 is connected to the terminal 2 thereof; so that in the position of the said switch 1 shown in Figure 1 a circuit is established by the mercury of the tube through the burner 9.

11 and 12 represent bimetallic blades suitably mounted at 13 and 14 respectively and adapted, when heated, to flex each in the direction of the other as indicated by the arrows. The arm $1^a$ of the switch 1 extends between the free ends of these thermostatic blades so that the flexing of the upper blade 11 will depress the arm 1ᵃ of the switch 1, and the flexing of the lower blade 12 will raise the said arm 1ᵃ.

15 indicates the grounded hand of a time clock 16, the precise type of which is not a feature of the invention, and 17 and 18 indicate adjustable contacts adapted to be set in various timed relation to each other as indicated by the dotted circles, so that the time for the grounded arm to close on the contact 17 may be set as desired, and the time at which the said arm closes on the contact 18 may also be variably set. The contact 17 is connected to one end of a heating coil 19 wound about the blade 12, the other end of this coil being connected by the line 20 to the terminal 3 of the switch 1, and the contact 18 is connected by a line 21 to one end of a heater 22 wound around the blade 11, the other end of this heater being connected by the line 23 to the terminal 4 of the switch 1.

It will be obvious that when the arm 15 closes on the contact 17 (provided the arm 1ᵃ of the switch 1 is horizontal so that the mercury connects the terminals 2 and 3) a circuit will be closed through the heater 19 of the blade 12 and the blade flexed upwardly, thus disconnecting the terminals 2 and 3 and shutting off the heater 19, at the same time causing the mercury of the switch 1 to connect the terminals 2 and 4 thereof and establishing a circuit through the burner or other control device 9. The blade 12 being no longer subject to the action of the heater 9 will, of course, duly return to its horizontal position.

After the desired lapse of time the operation of the clock 16 will cause the arm 15 to close on the contact 18 and a shunt circuit will be established through the line 23 and heater 22 of the blade 11 causing this to flex downwardly and again depress the arm 1ᵃ of the switch 1 to a horizontal position, whereupon the flow of mercury disconnects the terminals 2 and 4, shutting off the burner 9 at the desired time set by the clock, and at the same time establishing a mercury connection between the terminals 2 and 3 ready for the reclosing of a circuit through the heater 19 of the blade 12 when the arm 15 again closes upon the contact 17 of the clock at whatever point it may be set.

The arrangement shown in Figure 2 needs no further description as far as the wiring is concerned, the only difference being in the mercury switch 1ᶜ which is of a circular type adapted to be rotated about its axis by means of a radial arm 24 which extends between the blades 11 and 12; the mercury establishing connection between the radial terminals 2 and 4 or 2 and 3 as said arm is moved upwardly or downwardly by the blades 11 or 12 as the case may be.

This invention may be developed within the scope of the following claims without departing from the essential features of the said invention, and it is so desired that the specification and drawing be read as being merely illustrative, and not in a limited sense, except as necessitated by the prior art.

What I claim is:

1. In combination with a plurality of electric circuits, a switch for each of said circuits, a second switch for one of said circuits for controlling the circuit to the first named switch thereof, means for throwing said first switch to establish a closed circuit, and a thermostat comprising a bimetallic member flexible under the influence of a resistance coil in the established circuit for operating a switch to break the established circuit, said thermostat in breaking the established circuit throwing a switch to close another of the circuits, and means for breaking said last named circuit when and as desired.

2. In combination with a plurality of electric circuits, a switch for each of said circuits, a second switch for one of said circuits for establishing a circuit therethrough to said first named switch, timed means for automatically closing said first switch in accordance with a predetermined setting, a thermostat comprising a bimetallic member flexible under the influence of a resistance coil in the established circuit for operating a switch to break the established circuit, said thermostat in breaking the established circuit throwing a switch to close another of the circuits, and means for breaking said last named circuit when and as desired.

3. In combination with a plurality of electric circuits, a pivotally mounted mercury switch having three terminals for controlling the circuits, said switch comprising a bent tube having a terminal at its bend and a terminal at each end thereof and containing sufficient mercury to electrically connect either end terminal with the center terminal, a line leading from a source of electric energy constantly connected to said center terminal, means for closing a circuit through another terminal, means for automatically tilting said switch to break the closed circuit, said switch upon tilting connecting the center terminal with the other terminal to close a circuit therethrough and a shunt including a thermostat operatively placed with respect to said switch connected into said last named circuit, and means for grounding said shunt to energize said thermostat whereby said switch is tilted and said circuit is broken.

4. In combination with a plurality of electric circuits, a pivotally mounted mercury switch having three terminals for controlling the circuits, said switch comprising a bent tube having a terminal at its bend and a terminal at each end thereof and containing sufficient mercury to electrically connect either end terminal with the center terminal, a line leading from a source of electric energy constantly connected to said center terminal, means for closing a circuit through another terminal, means for automatically tilting said switch to break the closed circuit, said switch upon tilting connecting the center terminal with the other terminal to close a circuit therethrough and a shunt including a thermostat operatively placed with respect to said switch connected into said last named circuit, and means for automatically grounding said shunt in accordance with a predetermined setting, said thermostat being energized by the grounding of said shunt to tilt said mercury switch whereby the last named circuit and the shunt circuit is broken and whereby said mercury switch is returned to an operative proximity with respect to said first named means.

5. In combination with a plurality of electric circuits, a pivotally mounted mercury switch having three terminals for controlling the circuits, said switch comprising a bent tube having a terminal at its bend and a terminal at each end thereof and containing sufficient mercury to electrically connect either end terminal with the center terminal, a line leading from a source of electric energy constantly connected to said center terminal, means for closing a circuit through another terminal, means for automatically tilting said switch to break the closed circuit, said switch upon tilting connecting the center terminal with the other terminal to close a circuit therethrough, and timed means for automatically breaking said last named circuit according to a predetermined setting, said means tilting said switch to its first described position to re-establish a connection between the center terminal and the first named terminal.

6. In combination with a plurality of electric circuits, a triterminal mercury switch and a triterminal switch for controlling the circuits, one terminal of said mercury switch being constantly connected to a source of electric power, a second terminal of said mercury switch leading through an electric burner and being connected to a shunt including a thermostat to establish a circuit to one terminal of said second named switch, a third terminal of said mercury switch leading through a second thermostat to establish a circuit to the second terminal of said second named switch, said mercury switch being adapted for operation to connect either the second or third of its terminals with its other terminal, said second named switch when closed as to the first named terminal completing a circuit through one thermostat, said thermostat breaking the circuit therethrough and closing a circuit through said burner, said second named switch when closed as to its second terminal closing a circuit of the other thermostat, said last named thermostat breaking the circuit therethrough and through said burner by actuating said mercury switch to its original position.

7. The combination as set forth in claim 6 together with timed means for closing said second named switch to establish the first described circuit in accordance with a predetermined setting.

8. The combination as set forth in claim 6 together with timed means for closing said second named switch to establish the last named circuit in accordance with a predetermined setting.

9. The combination as set forth in claim 6 together with timed means for closing said second named switch to establish the first described circuit whereby said burner is thrown into operation at a predetermined time, and timed means for closing the second described circuit in accordance with a predetermined setting whereby the circuit through said burner will be broken at a predetermined time.

10. In combination a first triterminal switch, a second triterminal switch, electrical circuits interconnecting said switches and electro-thermo means controlled by said first triterminal switch for breaking the contact between two of the terminals of said second switch and for establishing contact between one of said two terminals and a third terminal, said electro-thermo means including two heater coils which are respectively connected to two of the terminals of said first switch, these terminals being selectively connectable to the other terminal of the same switch.

In testimony whereof I affix my signature.

WARREN NOBLE.